United States Patent
Singh et al.

(10) Patent No.: US 11,334,791 B2
(45) Date of Patent: May 17, 2022

(54) LEARNING TO SEARCH DEEP NETWORK ARCHITECTURES

(71) Applicant: Siemens Healthcare GmbH, Erlangen (DE)

(72) Inventors: Vivek Kumar Singh, Princeton, NJ (US); Terrence Chen, Princeton, NJ (US); Dorin Comaniciu, Princeton Junction, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 689 days.

(21) Appl. No.: 16/121,726

(22) Filed: Sep. 5, 2018

(65) Prior Publication Data

US 2020/0074296 A1 Mar. 5, 2020

(51) Int. Cl.
*G06N 3/08* (2006.01)
*G06N 3/04* (2006.01)
*G06N 20/00* (2019.01)

(52) U.S. Cl.
CPC ............. *G06N 3/08* (2013.01); *G06N 3/0454* (2013.01); *G06N 20/00* (2019.01)

(58) Field of Classification Search
CPC ......... G06N 3/08; G06N 3/0454; G06N 20/00
See application file for complete search history.

(56) References Cited

U.S. PATENT DOCUMENTS

2019/0251439 A1* 8/2019 Zoph ........................ G06N 3/08

FOREIGN PATENT DOCUMENTS

WO   WO2018081563 A9 * 10/2017

OTHER PUBLICATIONS

Baker et al., "Designing Neural Network Architectures Using Reinforcement Learning", Mar. 22, 2017, ICLR 2017, arXiv: 1611.02167v3 [cs.LG], pp. 1-18 (Year: 2017).*
Dornhan et al, Speeding up Automatic Hyperparameter Optimization of Deep Neural Networks by Extrapolation of Learning Curves , IJCAI, 2015 (9 pages). (Year: 2015).*
Andrychowicz et al., "Learning to Learn by Gradient Descent by Gradient Descent", 30th Conference on Neural Information Processing Systems, 2016, 17 pages.
Bello et al., "Neural Optimizer Search with Reinforcement Learning", Proceedings of the 34th International Conference on Machine Learning, Sydney, Australia, 2017, 12 pages.
Huang et al., "Densely connected convolutional networks", in Computer Vision and Pattern Recognition (CVPR), 2017, 9 pages.
He et al., "Deep Residual Learning for Image Recognition", The IEEE Conference on Computer Vision and Pattern Recognition, 2016, pp. 770-778.

(Continued)

*Primary Examiner* — Daniel T Pellett

(57) ABSTRACT

A trained recurrent neural network having a set of control policies learned from application of a template dataset and one or more corresponding template deep network architectures may generate a deep network architecture for performing a task on an application dataset. The template deep network architectures may have an established level or performance in executing the task. A deep network based on the deep network architecture may trained to perform the task on the application dataset. The control policies of the recurrent neural network may be updated based on the performance of the trained deep network.

20 Claims, 5 Drawing Sheets

(56) References Cited

OTHER PUBLICATIONS

Krizhevsky et al., "Imagenet classification with deep convolutional neural networks." Advances in Neural Information Processing Systems, 2012, 9 pages.
Li et al., "Learning to Optimize", ICLR 2017 Conference Submission, Nov. 4, 2016, 9 pages.
Mnih et al., "Human-Level Control Through Deep Reinforcement Learning." Nature, vol. 518, Feb. 26, 2015, 13 pages.
Silver et al., "Mastering the Game of Go with Deep Neural Networks and Tree Search", Nature, Jan. 28, 2016, 20 pages, vol. 529.
Simonyan et al., "Very Deep Convolutional Networks for Large-Scale Image Recoginition", ICLR conference paper 2015, Apr. 10, 2015, 14 pages.
Sreenivas Sremath Tirumala, "Implementation of Evolutionary Algorithms for Deep Architectures", Proceedings of the Second International Workshop on Artificial Intelligence and Cognition, 2014, pp. 164-171.
Szegedy et al., "Going Deeper with Convolutions", The IEEE Conference on Computer Vision and Pattern Recognition, 2015, pp. 1-9.
Zoph et al., "Neural Architecture Search with Reinforcement Learning", ICLR, 2017, 16 pages.

\* cited by examiner

LEARNING TO SEARCH DEEP NETWORK ARCHITECTURES

BACKGROUND

The present embodiments relate to deep network architectures. A deep network architecture may describe an arrangement of layers of a deep network and corresponding layer parameters used in machine learning. For example, a deep network may specify the size and number of kernels for a convolution layer or the size or drop probability of a dropout layer. Deep networks machine learned according to the deep network architectures may be designed to perform a task such as image classification, image segmentation, or data regression.

Researchers often work in teams to manually create deep network architectures that define a deep network for performing a task on a dataset. For example, a team of researchers may create a deep network architecture that defines a deep network adapted to perform image classification on a particular image dataset. However, the deep network may not be generalizable to other image datasets or other tasks. Developing deep network architectures for each task or dataset may require significant resources in the form of researcher hours, even where multiple teams of researchers are working in parallel to design new architectures for specific tasks.

SUMMARY

By way of introduction, the preferred embodiments described below include methods, systems, instructions, and computer readable media for designing deep network architectures. A deep network architecture is generated by applying a dataset to a machine-trained recurrent neural network. A deep network created from the generated deep network architecture may be trained to perform a task on the dataset.

In a first aspect, a method is provided for determining a deep network architecture. A first dataset representing image data is received and applied to a recurrent neural network having a set of control policies learned by reinforcement learning on a plurality of second datasets and corresponding network architectures. The deep network architecture is generated based on the application of the first dataset to the recurrent neural network having the set of control policies and output.

In a second aspect, a method is provided for training a recurrent neural network. A plurality of first datasets is received. One or more first deep network architectures associated with each dataset of the plurality of first datasets are stored. The recurrent neural network is trained based on the plurality of first datasets and the one or more first deep network architectures associated with each dataset of the plurality of first datasets. The training produces a set of control policies for generating one or more second deep network architectures in response to an input dataset.

In a third aspect, a system for the creation of a deep network architecture is provided. A dataset interface is configured to receive a first dataset. An image processor is configured by a machine-learned deep network to apply the first dataset to a recurrent neural network having a control policy learned on a plurality of second datasets and corresponding validated network architectures and generate the deep network architecture based on the application of the first dataset to the recurrent neural network having the set of control policies.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Figure 1:
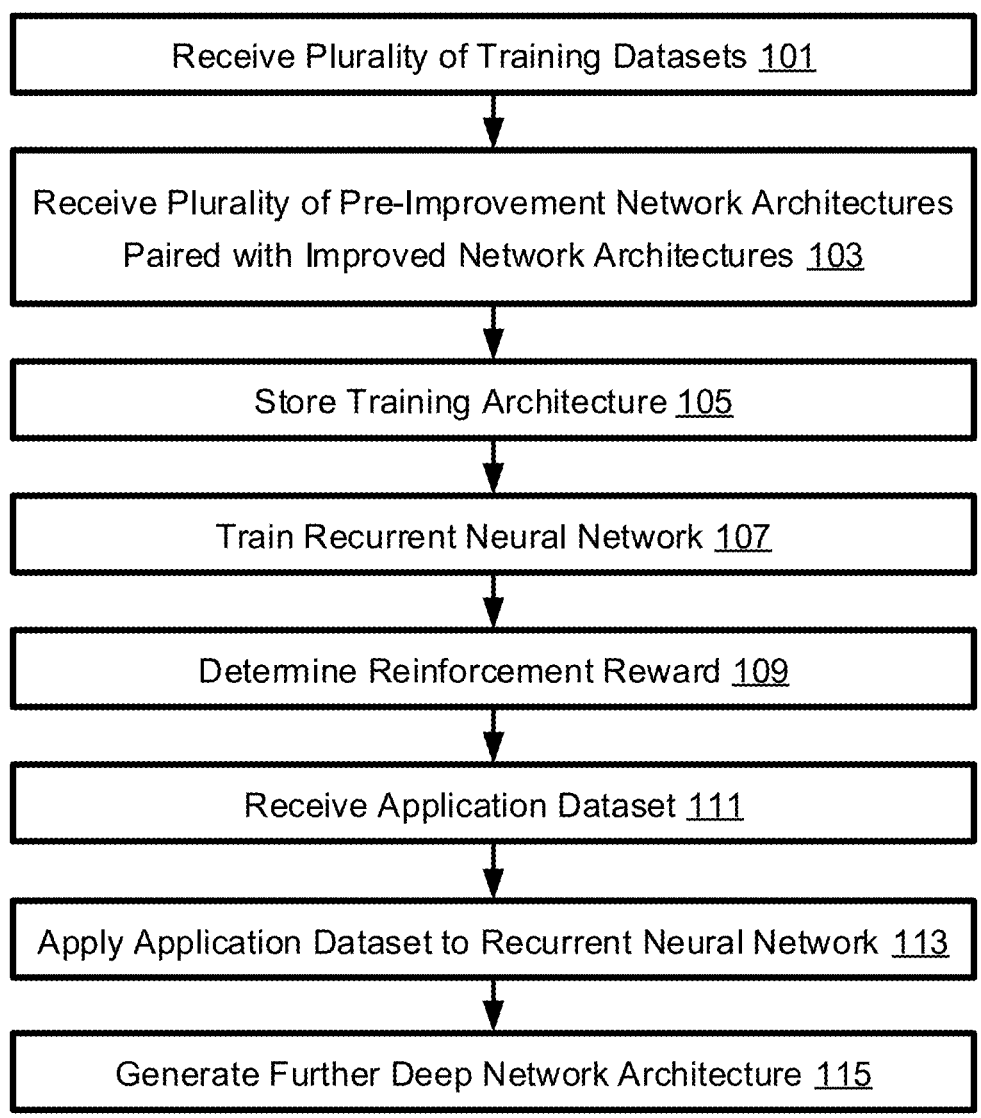
FIG. 1 is a flow chart diagram of an embodiment of a method for training a recurrent neural network.

Deep learning has been successfully applied to several applications in various domains. However, training deep networks by exploring various deep architectures manually may be time consuming and labor intensive. A recurrent neural network may be trained to efficiently search deep network architectures for a given task category, such as image classification or image segmentation.

The recurrent neural network may be trained on datasets and deep network architectures for the datasets proposed by, for example, literature or prior research. The recurrent neural network may systematically search a space of deep network architectures by emulating the natural evolution of how the architectures may be designed and evaluated for a given task by researchers working in the field of deep learning. For example, the ImageNet dataset has millions of images from 1000 classes and is a benchmark for image classification tasks. The recurrent neural network may model researchers in the field of machine learning as 'agents' in a reinforcement learning framework training deep networks and conducting the architecture search, where multiple researchers may be training and searching in parallel. Over time, various network designs are proposed and validated by the agents, and design elements from the highest performing architectures may be combined and incorporated to augment previous architectures or create a new architecture to perform well at the classification task. In some cases, multiple different architectures may be developed on a smaller dataset (Canadian Institute for Advanced Research or CIFAR, for example) before being applied to ImageNet.

The recurrent neural network may learn a set of control policies using reinforcement learning that serve as a set of design rules to create network architectures, which may be likely to perform a task with greater accuracy and better generalization as compared to previous architectures and/or may avoid extensive manual architecture design. The set of control policies may first be learned using supervised learning based on training datasets paired with architectures known to have good performance on the training datasets. The control policies may be updated using reinforcement learning as an application dataset previously unseen (e.g. not used for initial training of the recurrent neural network) is applied to the recurrent neural network to generate a deep network architecture to perform the task on the unseen application dataset. The set of control policies may apply to a task category and to multiple input datasets. For example, the recurrent neural network may learn a set of control policies for designing and training a deep classification network and a different set of policies for designing and training a deep regression network.

The control policies that enable the recurrent neural network to design the deep network architecture may be updated based on the performance of the generated architectures as applied to a specific dataset. For example, after several iterations of designing, training, and testing the performance of deep networks in performing a task on a specific dataset, the control policies of the recurrent neural network may be updated to reflect the best performing architectures.

While the deep network architectures generated by the recurrent neural network may be generalizable and able to perform the task on different unseen datasets, the recurrent neural network may be specific to the task. For example, a recurrent neural network may be trained to design deep neural networks for performing organ segmentation on a variety of image datasets. However, a different neural network may be trained to design deep network architectures for classifying audio data or images of handwriting.

FIG. 1 is a flow chart diagram of an embodiment of a method for training a recurrent neural network. The method may train a software agent to determine the next best action to execute via a set of control policies in order to achieve a given task on a dataset. The software agent (e.g. a meta learner) is trained to determine a set of control policies that would allow it to make design decisions to create and/or modify deep network architectures that may achieve higher accuracy or better generalization for the given task. A target loss function, a validation accuracy metric, and training and validation datasets may define the task.

Because training may be complex, a "training curriculum" may be provided to train recurrent neural networks. The training curriculum may imitate the way that deep learning researchers are taught how to design and train deep networks. The network may first be trained using supervised learning on deep network architectures and datasets that have been scrutinized by the research community.

More, fewer, or different acts may be performed. For example, act 103 may be omitted. In another example, acts 105, 107, 109, 111, 113, and 115 are iterative and may be repeated.

The acts are performed in the order shown (e.g., top to bottom or numerical) but may be performed in any order. For example, act 109 may follow from act 111.

In act 101, a plurality of training datasets is received. The datasets may be loaded, retrieved, or served from a memory. The memory may be located on a server that is accessible through a network connection. The datasets may be received through the network.

In some cases, the datasets are image datasets. For example, the datasets may be the Modified National Institute of Standards and Technology (MNIST) database or the CIFAR database. Each dataset of the plurality of datasets may contain a plurality of samples. For example, where the dataset is a handwriting dataset, the dataset may include a plurality of samples of handwriting images. Where the dataset is a medical image dataset, the dataset may include a plurality of samples of images of tissues. For example, the dataset may be a set of samples of organ images for organ segmentation. The training datasets may be used for supervised training of a recurrent neural network.

In act 103, a plurality of first network architectures paired with second network architectures is received. The architectures may be loaded, retrieved, or served from a memory. The memory may be located on a server that is accessible through a network connection. The architectures may be received through the network.

The first network architectures may be pre-improvement network architectures. The second network architectures may be improved network architectures that are obtained from the pre-improvement network architectures by applying one or more network design rules to the pre-improvement network architectures. For example, a network design rule may specify adding dropout layers, adding axial convolution layers, or approximating higher order kernels of a pre-improvement network architecture with one-dimensional kernels.

The improved architectures may describe deep networks with improved performance over the pre-improvement network architecture. The pre-improvement and the improved network architectures may be architectures which describe layers and layer parameters of deep networks adapted to perform a given task on a dataset. For example, the pre-improvement architectures or the improved architectures may describe the layers and layer parameters of deep networks for performing organ detection (e.g. a segmentation task) on a dataset. In another example, the pre-improvement architecture may be published in an article, trained, and tested. The improvement architecture may be published in the same or a different article and represent a modification of the pre-improvement architecture.

More architectures may be joined with the pre-improvement network architecture. For example, a second and a third improvement network architecture may be joined with the pre-improvement network architecture. The subsequent architectures may form a lineage showing a progression of changes to the pre-improvement network architecture according to one or more network design rules and the performance associated with each architecture of the lineage. By using the pairs (or more) of network architectures as an input to the recurrent neural network, the recurrent neural network may intuitively learn the rules and apply the rules during the process of designing a deep network architecture.

In some cases, one or more performance curves are received. The performance curve may represent a change or improvement in a performance of a task by a deep network generated based on the first network architectures as compared to the performance of the task by a deep network generated based on the second network architectures. The change in performance may be due to the application of the network design rules on the first network architectures. For example, network design rules for adding dropout layers may improve generalization of the first network architecture to perform multiple tasks, rules for adding a 1×1 convolution layer that performs convolution along a channel axis may improve a speed of the network, and rules for using multiple one-dimensional kernels to approximate multidimensional kernels may improve network speed. The performance curve may be used as a ground truth or reward in training the network to output network architectures.

For organ segmentation, the pre-improvement architecture may be an old or well established deep network architecture for segmentation, as described by a journal article. The improvement architecture may be a refinement of the well-established pre-improvement architecture as described by a more recent journal article. For example, the pre-improvement architecture may overfit a dataset. A network design rule may state that overfitting may be reduced by adding in a dropout layer. The improved architecture may be created by adding one or more dropout layers to the pre-improvement architecture according to the network design rule.

In act 105, one or more training deep network architectures and corresponding training datasets are stored. The training architectures and training datasets may be stored in a memory. The training architectures may be associated with each dataset of the plurality of training datasets. For example, the recurrent networks ResNets and DenseNets may be associated with the MNIST and CIFAR datasets. In a further example, a training set of standard medical images and one or more associated segmentation deep network architectures may be received. A single dataset of the plurality of training datasets may be associated with one or more training architectures. Alternatively, the architectures and training datasets are received over a network as needed for training.

In act 107, the recurrent neural network is trained. A processor may be configured to train the recurrent neural network with machine learning. For example, a processor may train a recurrent neural network by inputting the training sets of medical images and segmentation deep network architectures into the recurrent neural network.

The recurrent neural network may be a machine learning network with multiple nodes organized into one or more layers. A node in one layer may have a connection to each of the nodes in a subsequent layer. The connection may have a weight indicating a strength of the connection between two nodes. The weight of a connection may change as the recurrent neural network is trained or retrained. Any types of layers may be used, such as convolutional, fully connected/dense or long short-term memory units, or gated recurrent units. The network may be a hierarchical recurrent neural network with the layer type being predicted at the coarse layer and parameters being predicted at fine layers. For reinforcement learning, a control policy may describe a set of possible actions to be taken by a recurrent neural network having weighted connections. Modifying or updating the connection weights may change the set of control policies (and the set of possible actions) of the recurrent neural network.

In some cases, the recurrent neural network is trained with reinforcement machine learning. The training may input the plurality of training datasets and the one or more training deep network architectures associated with each dataset of the plurality of training datasets. The end result architectures and training datasets for those architectures are used to train the recurrent neural network to output an architecture for an unseen training dataset. Additionally or alternatively, the recurrent neural network may be trained on the pairs or groups of architectures previously used to create, modify, or improve previously designed architectures. The training may produce a set of control policies for generating one or more deep network architectures in response to an input dataset. By training the recurrent neural network with pre-defined training architectures that have been verified to have desirable performance in performing the task on the training dataset, the recurrent neural network may more easily learn common patterns of high performance architectures.

In act 109, a reinforcement reward is determined for reinforcement training. The reinforcement reward may be determined by a processor coupled to a memory. The reinforcement reward may be for an offline training or an online training of the recurrent neural network. The reinforcement reward may be determined based on one or more performance curves of the paired pre-improvement and improved architectures. The reinforcement reward may encourage the agent or recurrent neural network to implement the network design rules that resulted in the improved performance of the improved architectures as compared to the pre-improvement architectures.

For example, organ segmentation deep network architectures that had good performance in segmenting organs in the training set of medical images may have a performance curve. The recurrent neural network may be trained by accepting the performance curve as input. By training the recurrent neural network on the performance curves of the segmentation architectures, the recurrent neural network may increase the weight of or otherwise strengthen the connections between nodes that cause the recurrent neural network to predict the segmentation architectures.

In act 111, an application dataset is received. The application dataset may be loaded, retrieved, or served from a memory. The memory may be located on a server that is accessible through a network connection. The application dataset may be received through the network. The application dataset may be a dataset that the recurrent neural network was not trained on. For example, the application dataset may be a dataset that is previously "unseen" by the recurrent neural network. For example, the application dataset may be a set of medical scans of organs that is different from the sets of medical images in the training datasets. After training for architecture generation, the recurrent neural network is to be used to design a network architecture to be used to machine train a network. An unseen dataset to be used to train a network for a new classification, detection, or other application is received by the trained recurrent neural network, which will create the network architecture to be used for the new network based on the unseen training data (i.e., application dataset).

The application dataset may include a plurality of samples. In some cases, the application dataset includes one or more subsets. The subset may include ground truths of the application dataset. The application dataset may be used during an active learning pipeline for the recurrent neural network. The active learning pipeline may use the recurrent neural network, previously trained on the training datasets and the training architectures, to create deep network architectures to perform a task on the application dataset. Control policies of the recurrent neural network may be updated based on the performance.

In act 113, the application dataset is applied to the trained recurrent neural network having a set of control policies. A processor may execute instructions stored in a memory to input the dataset to the trained recurrent neural network. The application dataset may form an input to the recurrent neural network configured to generate a deep network architecture based on an input dataset. For example, the application dataset that includes a set of medical scans of organs may be input to the trained recurrent neural network.

In act 115, a deep network architecture is generated based on the application of the application dataset to the trained recurrent neural network. The trained recurrent neural network outputs a neural network architecture in response to the input of the application dataset. For example, a processor may be configured by the trained recurrent neural network to output a deep network architecture based on an input application dataset. The output neural network architecture is determined from the learned control policies. For example, a deep network architecture may be output from the recurrent neural network that specifies a deep neural network for segmenting organs from input medical image data.

In some cases, an activation function such as a rectified linear unit (RELU) may be used to generate the deep network architecture. The RELU is part of the recurrent neural network or learned policies. The activation function may allow for some stochasticity in predicting or generating the deep network architecture.

Figure 2:
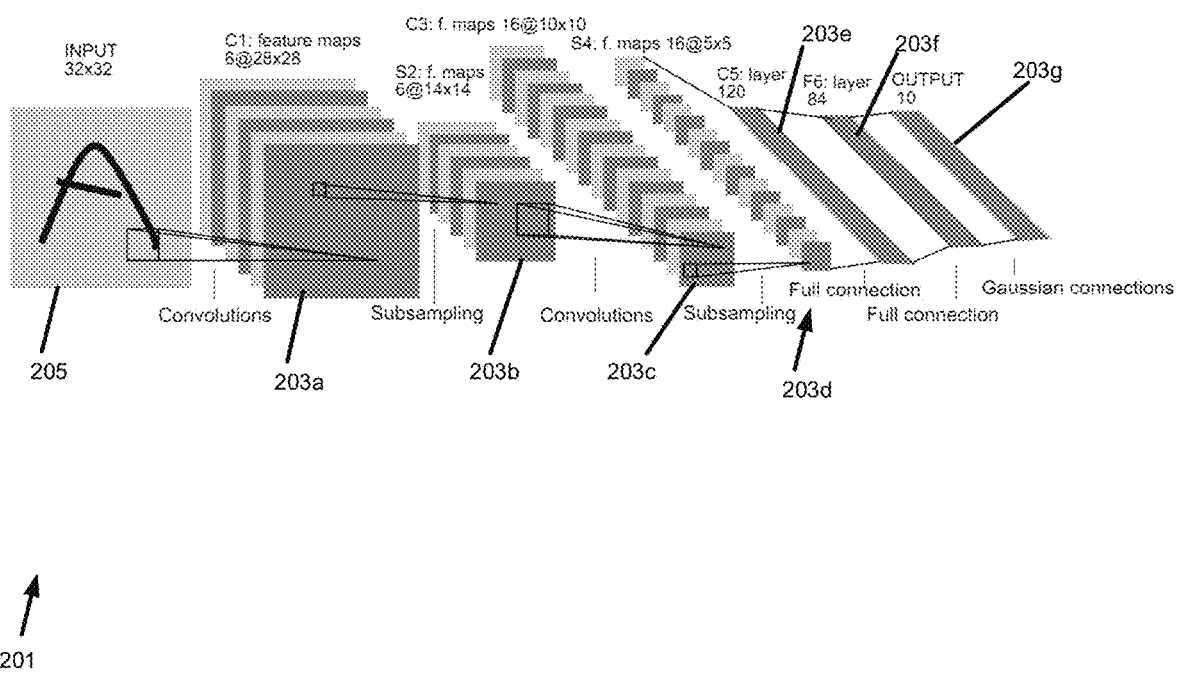
FIG. 2 is a schematic representation of a deep network architecture.

FIG. 2 is a schematic representation of a deep network architecture 201. The deep network architecture 201 may be an output of a recurrent neural network. For example, the deep network architecture may be the deep network architecture generated in act 115 of FIG. 1. Layers 203a-203f process an input dataset 205 into an output layer 203g.

In some cases, the input dataset 205 may be images. For example, the input 205 may 32×32 images of a handwriting samples. In another example, the images may be medical images. In other cases, the input dataset may be audio data. For example the input dataset may be samples of speech. The input may be samples of images or a dataset representing the images. The images may be classified by being input a deep network defined by the deep network architecture 201

The first layer 203a may be a convolution layer with 6 5×5 kernels with dilation of 1 and stride of 1. The layer 203b may be a Max Pooling layer with 2 by 2 stride. The layer 203c may be a convolution layer with 16 5×5 kernels with dilation of 1 and stride of 1. The layer 203d may be a Max Pooling layer with 2 by 2 stride. Layers 203e, 203f, and 203g may be dropout layers with sizes 120, 84, and 10, respectively.

Other numbers of layers, types of layers, order of layers, connections between layers (e.g., feed forward, feedback and/or skip connections), and/or combinations of layers with the same, different, fewer, or additional parameters may be possible. For example, a deep network architecture adapted for segmenting organs in images may specify a convolutional neural network having multiple successive convolution layers followed by one or more max Pooling layers.

The deep network architecture 201 may be represented by a sequence of layers and layer parameters. For example, the deep network architecture may be represented as C(6, 5, 5, 1, 1) M(2,2) C(16, 5, 5, 1, 1) M(2,2), D(120), D(84), D(10) In some cases, the deep network architecture may be represented by a sequence of discrete integers mapped to a dictionary. For example, the deep network architecture may be encoded as the string 1, 6, 5, 5, 1, 1, 2, 2, 2, 1, 16, 5, 5, 1, 1, 2, 2, 2, 3, 120, 3, 84, 3, 10. The sequence of integers may be validated to ensure the deep network architecture describes a valid deep network.

Figure 3:
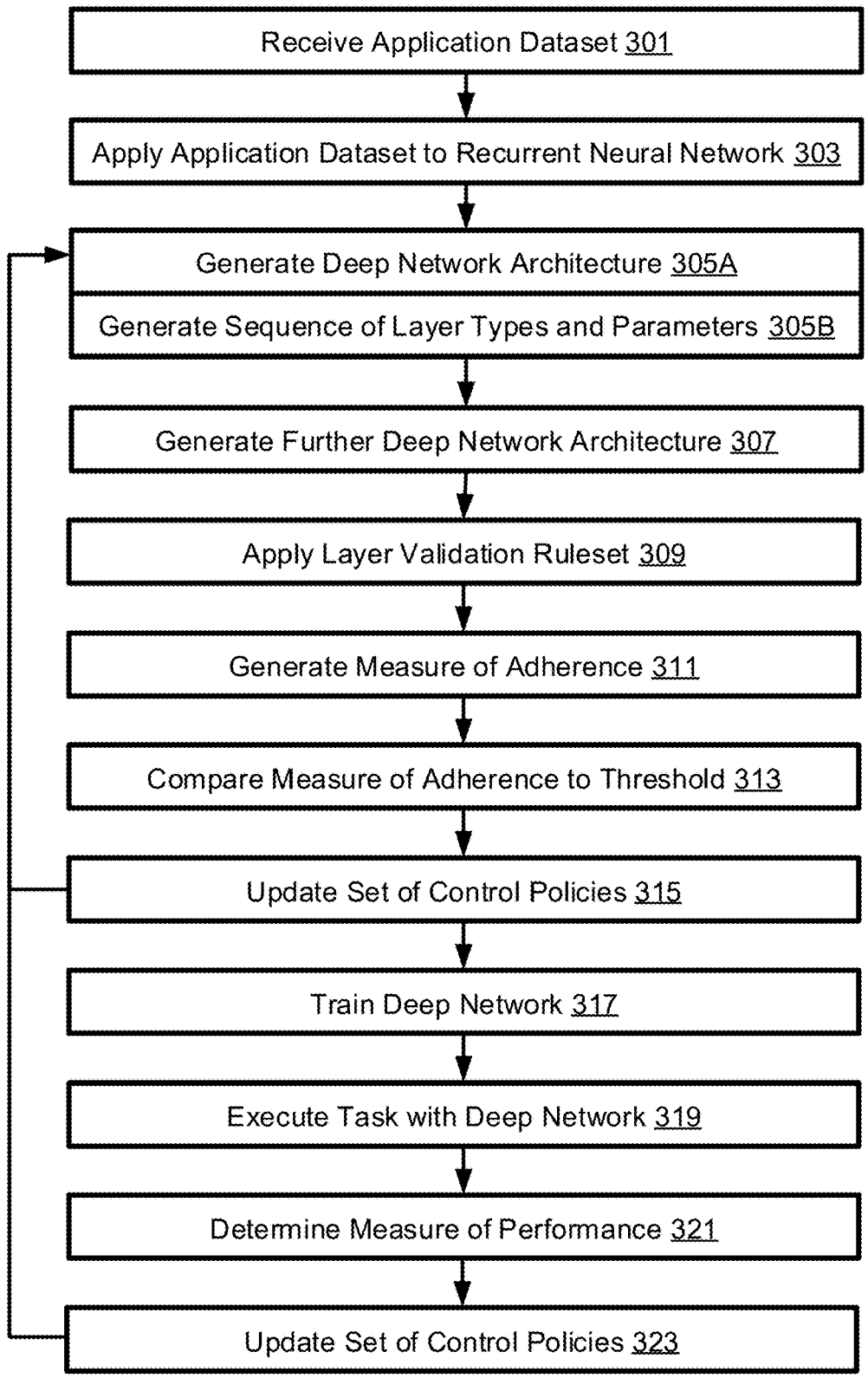
FIG. 3 is a flow chart diagram of one embodiment of a method for determining a deep network architecture.

FIG. 3 is a flow chart diagram of one embodiment of a method for determining a deep network architecture. The deep network architecture may be determined during an online reinforcement learning process with the recurrent neural network. The reinforcement learning process may use the trained recurrent neural network from FIG. 1.

More, different, or fewer acts may be present. For example, act 313 may be omitted. The acts are performed in the order shown (e.g., top to bottom or numerical) but may be performed in any order. For example, act 317 may proceed directly from act 307. In some cases, the acts may repeat. For example, acts 305-315 may repeat during an iteration. Multiple iterations of the acts may be performed.

In act 301, an application dataset is received. The application dataset may be an image dataset. In some cases, the dataset includes samples. For example, an image application dataset may contain samples of images.

In some cases, metadata about the application database may be received. One or more of a performance curve, a size of the application dataset, a size of an input to a deep network architecture, a size of an output of the deep network architecture, or a measure of an availability of a computational resource may be received with the application dataset. For example, the computational resource may be a measure of available processing time or storage for implementing the deep network architecture. The processing time availability measure may be a maximum amount of processing time that the deep network may have to perform the task. The storage availability measure may be a maximum size (e.g. in bits) of the deep network architecture.

In act 303, the application dataset may be applied to a recurrent neural network. The application dataset may be applied to an input of the recurrent neural network. The recurrent neural network may have a set of control policies learned by reinforcement learning on a plurality of training datasets and corresponding training deep network architectures. The training deep network architectures may have been validated to have a minimum or established level of performing a task on the respective training dataset. For example, prior research may validate the training deep network architectures to have an expected level of performance in performing the task on the training dataset.

In act 305A, a deep network architecture is generated based on applying the application dataset to the trained recurrent neural network having a set of control policies. The control policies may direct the recurrent neural network to design a deep network architecture based on the input application dataset. In some cases, the output deep network architecture may be generated by the recurrent neural network learned with a reward function based on the performance curve, the size of the application dataset, the shape of the input to the deep network architecture, and/or the measure of availability.

In act 305B, a sequence of layer types and layer parameters are generated. The sequence may be generated based on the application of the application dataset to the recurrent neural network. In response to input of the application dataset, the machine-learned recurrent neural network outputs the neural network architecture to be used.

The output neural network architecture is coded or parameterized as a sequence, but other representations may be used, such as a graphical output. The sequence of layer types and layer parameters may form or represent the deep network architecture. In some cases, each layer of the deep network architecture may be encoded or expressed as a string. The sequence may be a sequence of strings specifying the details of each layer of the deep network architecture. For example, a Convolution layer with 7 3×3 kernels with dilation of 1 and stride of 1 may be encoded by the string C(7, 3, 3, 1, 1). In another example, a Max Pooling layer with 2 by 2 stride may be encoded by the string M(2, 2). In a further example, a RELU layer may be encoded by a string starting with R, and a leaky RELU layer may be encoded by a string starting with L. Other layers may be encoded by strings, such as dropout and spatial dropout layers. An example string for handwriting analysis may specify a layer sequence of C(6, 5, 5, 1, 1) M(2,2) C(16, 5, 5, 1, 1) M(2,2), D(120), D(84), D(10). An example string for a task of organ segmentation in an image may specify a different layer sequence.

In some cases, an output space of the recurrent neural network may be discretized. An output space may be one or more output layers of the recurrent neural network. For example, the output space of the recurrent neural network may encode the output deep network architecture. Any coding may be used, such as a reference to a table or list of architectures. For example, the architecture is encoded as an integer that refers to a particular architecture and/or characteristic of an architecture (e.g., number of layers, order of layers, type of layer, parameters of each layer, and/or other representation). In some cases, each type of layer may correspond to a different integer.

A dictionary mapped to the discretized output space of the recurrent neural network may allow for decoding and interpretation of an output of the recurrent neural network. For example, the dictionary may decode an output deep network architecture that was encoded by the discretized output space of the recurrent neural network. The dictionary may map each integer of the deep network architecture to a particular layer type and/or layer parameter. For example, the layer type may be an integer. The integer 1 may map to a convolution layer while the integer 2 maps to a max Pooling layer. Subsequent integers in the sequence may correspond to layer parameters. The dictionary may define a regular format of the discretized deep network architecture. Because the dictionary may decode an output of the discretized output space of the recurrent neural network, the dictionary may allow for the output of the recurrent neural network and the deep network architecture to be checked for validity.

In act 307, a further deep network architecture is generated. More than one deep network architecture may be generated at a time. For example, the application dataset may be applied multiple times to the recurrent neural network to generate multiple deep network architectures. Stochasticity in the recurrent neural network may cause the multiple deep network architectures to differ from one another. Multiple deep network architectures may allow for training and performance evaluations of the deep network architectures in parallel.

In act 309, a layer validation ruleset may be applied to the deep network architecture. In some cases, the layer validation ruleset may be applied to the discretized deep network architecture. The validation ruleset may validate the format and content of the deep network architecture. For example, a rule of the validation ruleset may specify that if C (a convolution layer) is predicted by the recurrent neural network at a place in the deep network architecture, the next 5 integers predicted must be integers that correspond to parameters of the convolution layer. In another example, another rule may specify that for a concatenation layer, concatenation is only allowed between two layers that are specified by an index relative to a current layer (e.g. represented by integers −1 and −2 for concatenation of the previous two layers in the sequence). Multiple concatenation layers in succession may be allowed by a rule. In some cases, the recurrent neural network may not predict an input or output size or shape of the deep network architecture. Instead, the input and output shape may be specified. For example, the input shape may be part of an input to the recurrent neural network. The validation ruleset may specify a size and shape of the output. For example, for a classification task with ten output cases, the output layer may be required to have 10 hidden variables. In a further example, for a segmentation task, the output layer must have the same shape as the input image. Other rules directed to the organization of layers, particular layers, parameters of layers, the input, the output, and/or other architecture of a neural network may be used.

The adherence may be a requirement. If the architecture does not adhere, then the application dataset is applied again where the recurrent neural network includes a stochastic process. Alternatively or additionally, different samples or subset of the application dataset are input to obtain an altered output.

In another embodiment, adherence is not required. In act 311, a measure of adherence of the deep network architecture to the validation ruleset may be generated. The measure of adherence may have a value indicating a number or proportion of validation rules that the deep network architecture does or does not comply with. For example, where a deep network architecture complies with every validation rule applied to the deep network architecture, the measure of adherence may be set to 100 to indicate full compliance. In another example, full compliance may be expressed as a value of 0, where there are no validation rules unsatisfied by the deep network architecture. Other values of the measure of adherence are possible. Different rules may be weighted the same or differently. Any function may be used, such as a weighted average or sum, for the measure of adherence.

In act 313, the measure of adherence is compared to a threshold. The threshold may have a value representing a level of adherence. Where the measure of adherence is greater than the threshold value (or less than the threshold value where 0 represents full compliance), the deep network architecture may be retained and trained. Where the measure of adherence is less than the threshold value (or greater than the threshold value where 0 represents full compliance), the deep network architecture may not be valid. Invalid deep network architectures may be discarded.

The comparison may be used in on-going training of the recurrent neural network. In act 315, the set of control policies of the recurrent neural network are updated. The control policies may be updated by modifying weights of connections between nodes of the recurrent neural network. The connection weights may be modified by retraining the recurrent neural network. The control policies may be updated based on the comparison of the measure of adherence to the threshold. For example, where the threshold establishes that a deep network architecture is valid, the control policies may be updated to strengthen or give more weight to control policies (or connections between nodes) that generated a valid architecture. A reward function may be used to retrain the recurrent neural network to reinforce control policies or connection weights that predict or generate a valid deep network architecture. In another example, where the threshold establishes that the deep network architecture is not valid, the set of control policies may be updated to discourage or reduce the weight of control policies that predicted an invalid architecture. In some cases, the recurrent neural network may generate a new deep network architecture based on the updated control policies. In other cases, the valid deep network architecture may be output.

In act 317, a deep network based is trained. For example, a processor may be configured to train the deep network with machine learning. The deep network may be trained based on the further deep network architecture. The deep network may have layers and layer parameters as encoded or specified in the deep network architecture. Machine learning is performed using the deep architecture and the application dataset. The deep neural network is trained to classify, detect, or generate another output based on the samples and ground truths of the application dataset. In some cases, where multiple deep network architectures are produced by the recurrent neural network, multiple deep networks may be trained in parallel or sequence based on the application dataset.

The deep network is trained to perform a task using an application dataset. The deep machine learning relates the input samples of the application dataset with the ground truths for the samples. For example, the kernel for convolution layers, connections between nodes, weights for connections, or other programmable characteristics of the deep network are learned.

Some of the application dataset may not be used in initial training. For example, the deep network may be trained on a training subset of the application dataset. Another subset is reserved for validation or testing.

In act 319, the trained deep network or networks may execute the task. The task may be executed on the application dataset. For example, the deep network may perform an image classification or segmentation task on an unseen dataset. The unseen dataset may be an unseen subset of another dataset. For example, the unseen dataset may be an unseen subset of the application dataset. In some cases, where multiple deep networks are trained, the deep networks may perform the task in parallel. For example, multiple copies of the application dataset may be made such that each deep network may execute the task on the unseen dataset at the same time.

In act 321, a measure of performance of the task may be generated. The measure of performance may be a measure of a completeness, accuracy, speed, generalizability, resource consistency, or other aspect of the performance of the task by the deep network. For example, the measure of performance may be a measure of an accuracy of the deep network in classifying images in the application dataset. An error from the ground truth based on the testing or validation of act 317 is determined. In another example, the performance measure may be a measure of a generalizability of the deep network in executing the task on different datasets or portions of datasets. Generalizability may measure consistence in executing the task. In some cases, where there are multiple deep networks executing the task on the application dataset, each deep network may be assigned a measure of performance. The measure of performance may be based on comparing the performance of the deep network to a standard or expected performance. For example, the performance of the deep network may be compared to a measure of performance of a known or established deep network executing the same task. The performance measure may form part of the reinforcement reward.

In act 323, the set of control policies may be updated. The control policies may be updated similar to act 315. The control policies may be updated by modifying values of parameters (e.g., weights of connections between nodes) of the recurrent neural network. The parameter values may be modified by retraining the recurrent neural network.

The control policies may be updated with reinforcement learning or according to a reinforcement reward. The set of control policies may be updated based on the measure of performance. For example, the recurrent neural network may be retrained using reinforcement learning with a reward function incorporating the measure of performance and/or performance curves of the paired pre-improvement and improved architectures. The reward may encourage design decisions by the recurrent neural network that led to high-performing deep networks.

Weights of the control policies may be increased in response to a high performance or decreased in response to a low performance. In some cases, where there are multiple deep networks receiving measures of performance, the control policies may be updated with a batch of performance measures. Additionally or alternatively, the control policies may be updated serially or on a semi-batch basis. By updating the control policies, the recurrent neural network may generate one or more new deep network architectures for the application dataset according to the updated control policies that improve on the performance of the further deep network architecture.

To prevent the recurrent neural network from reinforcing unusual or undesirable network architectures over subsequent iterations of generating, validating, and testing the performance of the deep network architectures, the best performing deep network architectures may be retained. For example, where the performance of deep network architectures generated by the recurrent neural network decreases with subsequent iterations, the highest performing deep network architectures from previous iterations may be retained.

The recurrent neural network having the updated control policies may generate an updated deep network architecture based on the application of the application dataset. The updated deep network architecture may incorporate any information the recurrent neural network has learned from the performance of the deep network architecture via the updated control policies. Acts 305B-323 may be repeated based on the updated control policies.

Figure 4:
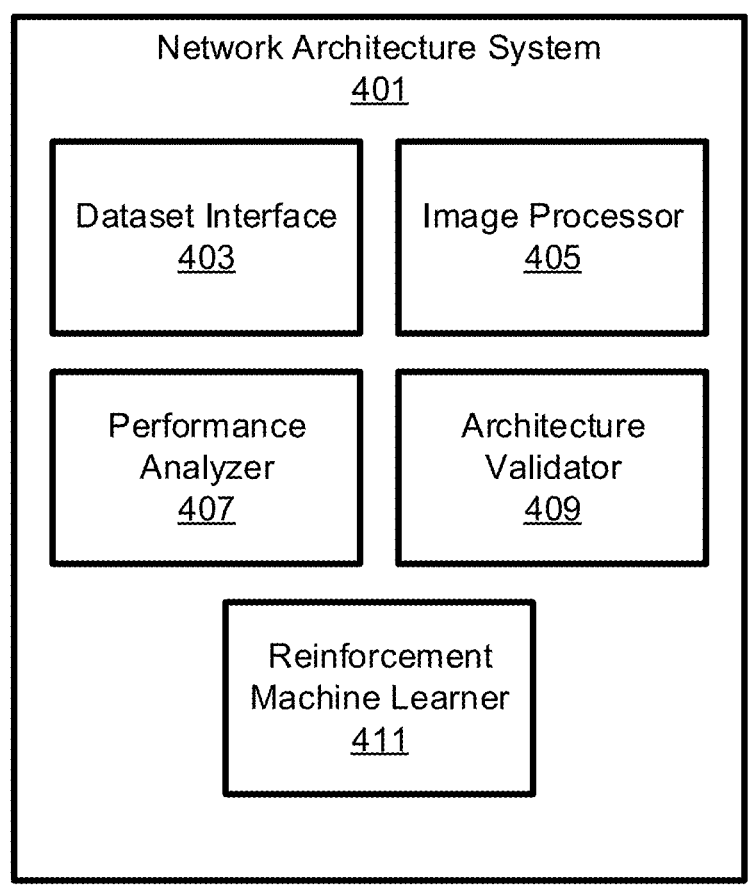
FIG. 4 is a block diagram of a system for the creation of a deep network architecture.

FIG. 4 is a block diagram of a system 401 for the creation of a deep network architecture. The network architecture system 401 may include a dataset interface 403, an image processor 405, a performance analyzer 407, an architecture validator 409, and a reinforcement learner 411. The system may be implemented on a computing device with memory and a general processor or an application specific integrated circuit.

The dataset interface 403 may be configured to receive an application dataset. The dataset interface may include a network interface for receiving the application dataset over a network connection. The application dataset may be an image dataset. For example, the application dataset may be a set of images of handwriting. The dataset may be associated with a specific task. For example, the Modified National Institute of MNIST database and CIFAR database may be associated with a classification task.

The image processor 405 may be a computer, general processor, artificial intelligence processor, an application specific integrated circuit, or another machine. The image processor 405 may be configured to apply the application dataset to a recurrent neural network. The recurrent neural network may have a set of control policies learned on one or more training datasets and corresponding training deep network architectures. For example, the training dataset may be the CIFAR 100 dataset and the corresponding training deep network architectures may be DenseNets architectures for performing handwriting recognition.

The image processor 405 may be further configured to generate a deep network architecture based on applying the application dataset to the trained recurrent neural network having the set of control policies. The image processor 405 may generate a sequence of layer types and layer parameters that represent the deep network architecture based on applying the application dataset to the recurrent neural network.

The image processor 405 may be further configured to generate and train a deep network based on the deep network architecture.

The performance analyzer 407 may be configured to execute a task on the application dataset using a deep network based on the deep network architecture. The performance analyzer 407 may be executed or implemented by a processor in communication with a memory. For example, the processor may be the image processor 405 or a different processor. Where the application dataset is associated with a specific task, the performance analyzer 407 performs the task on the application dataset using the deep network. Where the application dataset is the MNIST dataset, for example, the performance analyzer may use the deep network to classify handwriting samples from the dataset.

The performance analyzer 407 may measure the performance of the deep network in executing the task on the application dataset. The measure of performance may be a measure of accuracy, generalizability, or resource consistency of the deep network in executing the task. The measure of performance may be used to update the control policies of the recurrent neural network.

The architecture validator 409 is the processor that may be configured to apply a validation ruleset to the deep network architecture. The validation ruleset may ensure that the sequence and order of the layers and layer parameters defines a deep network architecture that is valid for performing the task. The architecture validator 409 may determine a measure of compliance of the deep network with the validation ruleset. For example, where there are 10 rules in the validation ruleset and the deep network architecture complies with 9 of them, the architecture validator 409 may assign a value of 90% to the measure of adherence. In another example, where the deep network complies with 3 of 5 validation rules, the architecture validator 409 may assign a value of 2 to the measure of adherence.

The architecture validator 409 may compare the value of the measure of adherence to a threshold for passing validation. If the deep network architecture passes validation, the control policies of the recurrent neural network may be updated to increase the weights of control policies that generated a valid deep network architecture.

The reinforcement machine learner 411 is the processor that may be configured to update the control policies of the recurrent neural network based on a measure of adherence to a set of architecture validation rules by a deep network architecture designed by the recurrent neural network. The control policies may be updated using machine learning. Additionally or alternatively, the reinforcement machine learner 411 may be configured to update the set of control policies based on a measure of performance of a deep network created from a deep network architecture designed by the recurrent neural network. The image processor 405 may be configured to generate an updated deep network architecture based on applying the application dataset to the recurrent neural network having the updated control policies.

Figure 5:
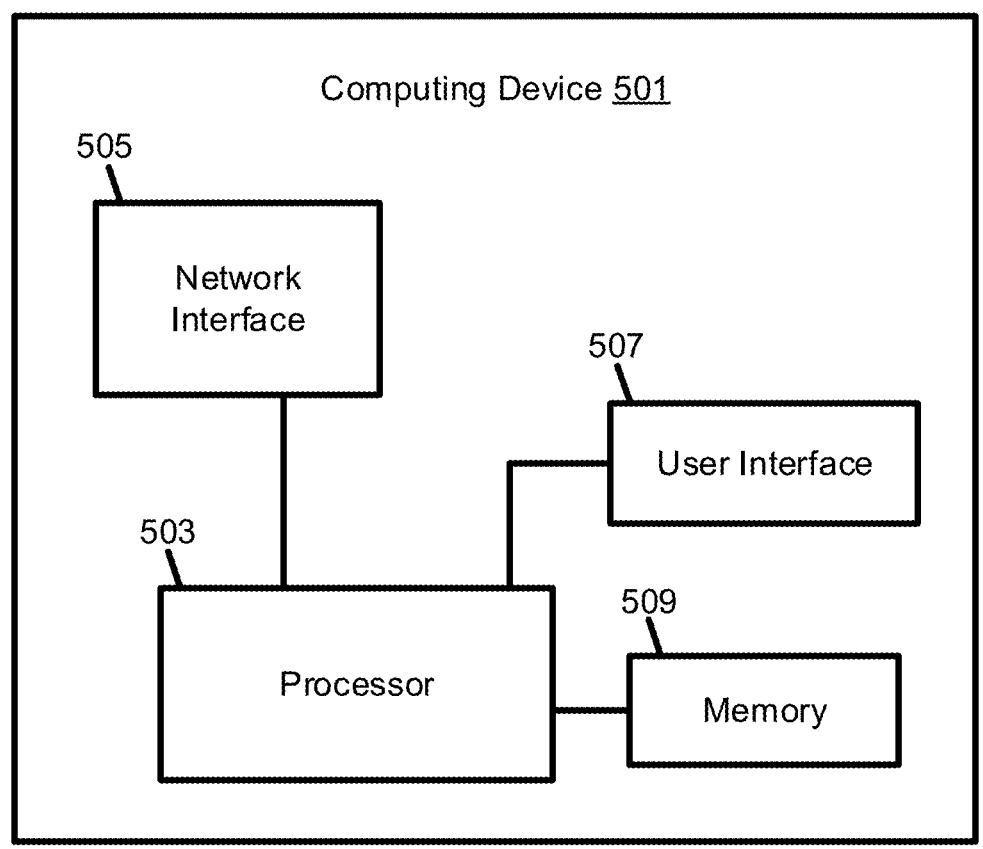
FIG. 5 is a block diagram of a computing device for machine training.

FIG. 5 is a block diagram of a computing device 501 for machine training. The computing device 501 may include a processor 503, a network interface 505, a user interface 507, and a memory 509. The computing device 501 may be configured to implement one or more acts of the methods in FIG. 1 or FIG. 3. For example, the computing device 501 may be configured to perform any or all of acts 101-125 in FIG. 1 and/or any or all acts 301-323 of FIG. 3. Additionally or alternatively, the computing device 501 may be configured to implement the network architecture system 401 of FIG. 4.

One computing device, such as a server, may be used to train the recurrent neural network, and another computing device, such as a computer, may be used to apply the recurrent neural network and train the resulting deep neural network. Yet another computing device may be used to apply or use the trained deep neural network. A computer network may connect the computing devices together, such as the computer for training the deep neural network connecting to the server for training the recurrent neural network in order to feedback performance measures and/or rule validation information. A single computing device may train and apply both the recurrent neural network and output deep neural network.

The processor 503 may be a general processor, artificial intelligence processor, field programmable gate array, graphics processing unit, an application specific integrated circuit, and/or another machine for training and/or applying neural networks. The processor 503 may be in communication with other components of the computing device 501 such as the network interface 505, the user interface 507, and the memory 509. The processor 501 may form part of or implement the image processor 405 of FIG. 4.

The network interface 505 may communicate through the network to send and receive data. For example, the network interface 505 may be configured to receive a training dataset and associated training deep network architectures or an application dataset. The network interface 505 may implement the dataset interface 403 of FIG. 4.

The user interface 507 may be configured to accept user input and to display audiovisual information to the user. The user interface 507 may include a user input device and a display. In some cases, the user may input information relating to the training or application of a machine learning network. For example, a user may select a particular task or training dataset and training network architecture using the user interface 507. In another example, the measure of performance or validation may be displayed to the user with the user interface 507.

The memory 509 may be a non-transitory computer readable storage medium. The memory 509 may be configured to store instructions that cause the processor to perform an operation. For example, the memory may store instructions that, when executed by the processor, cause the processor to perform one or more acts of FIG. 1 or FIG. 3. The instructions for implementing the processes, methods, and/or techniques discussed herein are provided on non-transitory computer-readable storage media or memories, such as a cache, buffer, RAM, removable media, hard drive, or other computer readable storage media. Non-transitory computer readable storage media include various types of volatile and nonvolatile storage media. The memory 509 may also be configured to store the training dataset, training deep network architecture, and the application deep network architecture.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for determining a deep network architecture, the method comprising:
   receiving, by a processor, a first dataset representing image data;
   applying, by the processor, the first dataset to a recurrent neural network having a set of control policies learned by supervised learning on a plurality of second datasets and corresponding known network architectures and by reinforcement learning on a plurality of validated deep network architectures;
   generating, by the processor, the deep network architecture based on applying the first dataset to the recurrent neural network having the set of control policies; and
   outputting, by the processor, the deep network architecture.

2. The method of claim 1, further comprising:
   training, by the processor, a deep network based on the deep network architecture; and
   executing, by the processor, a task on the first dataset using the deep network,
   wherein a format of each of the validated deep network architectures is validated to perform the task on the plurality of second datasets.

3. The method of claim 1, further comprising:
   training, by the processor, a deep network based on the deep network architecture;
   executing, by the processor, a task on the first dataset using the deep network;
   determining, by the processor, a measure of performance of the task executed on the first dataset; and
   updating, by the processor, the set of control policies of the recurrent neural network based on the measure of performance, the updating producing an updated set of control policies.

4. The method of claim 3, further comprising:
   applying, by the processor, the first dataset to the recurrent neural network having the updated set of control policies; and
   generating, by the processor, an updated deep network architecture based on applying the first dataset to the recurrent neural network having the updated set of control policies.

5. The method of claim 3, wherein the measure of performance is a measure of one or more of an accuracy, a generalizability, or a resource consistency of the deep network architecture.

6. The method of claim 1, wherein generating the deep network architecture further comprises:
   generating, by the processor, a sequence of one or more layer types with one or more layer parameters based on applying the first dataset to the recurrent neural network having the set of control policies, the sequence representing the deep network architecture.

7. The method of claim 1, further comprising:
   applying, by the processor, a layer validation ruleset to the deep network architecture;
   generating, by the processor, a measure of adherence of the deep network architecture to the layer validation ruleset;
   comparing, by the processor, the measure of adherence to a threshold; and
   updating, by the processor, the set of control policies of the recurrent neural network based on the measure of adherence when the measure of adherence is below the threshold, the updating producing an updated set of control policies.

8. The method of claim 7, wherein an output space of the recurrent neural network is discretized and mapped to a dictionary, and
   wherein the layer validation ruleset is applied to the deep network architecture using the dictionary.

9. The method of claim 1, further comprising:
   receiving, by the processor, one or more of a performance curve, a size of the first dataset, a shape of an input to the deep network architecture, a shape of an output of the deep network architecture, or a measure of an availability of a computational resource,
   wherein generating the deep network architecture is based on one or more of the performance curve, the size of the first dataset, the shape of the input to the deep network architecture, the shape of the output of the deep network architecture, or the measure of the availability of the computational resource.

10. The method of claim 1, further comprising:
    generating, by the processor, a further deep network architecture based on applying the first dataset to the recurrent neural network having the set of control policies;
    training, by the processor, a deep network based on the deep network architecture and a further deep network based on the further deep network architecture;
    executing, by the processor, a task on the first dataset using the deep network and the further deep network;
    determining, by the processor, a first measure of performance of the task executed on the first dataset using the deep network and a second measure of performance of the task executed on the first dataset using the further deep network; and
    updating, by the processor, the set of control policies of the recurrent neural network based on the first measure of performance and the second measure of performance.

11. A method for training a recurrent neural network, the method comprising:
    receiving, by a processor, a plurality of first datasets;
    storing, by the processor, one or more first deep network architectures associated with each dataset of the plurality of first datasets; and
    training, by the processor with reinforcement machine learning, the recurrent neural network based on the plurality of first datasets and the one or more first deep network architectures associated with each dataset of the plurality of first datasets, the training producing a set of control policies that direct generation of one or more second deep network architectures having valid architectures according to a layer validation ruleset in response to an input dataset.

12. The method of claim 11, further comprising:
    receiving, by the processor, a second dataset;
    applying, by the processor, the second dataset to the recurrent neural network having the set of control policies;
    generating, by the processor, a further deep network architecture based on applying the second dataset to the recurrent neural network having the set of control policies;
    training, by the processor, a deep network based on the further deep network architecture;
    executing, by the processor, a task on the second dataset using the deep network;
    determining, by the processor, a measure of performance of the task executed on the second dataset; and updating, by the processor, the set of control policies of the recurrent neural network based on the measure of performance, the updating producing an updated set of control policies.

13. The method of claim 12, wherein each dataset of the plurality of first datasets comprises a plurality of samples, and
wherein the second dataset comprises a plurality of samples.

14. The method of claim 11, further comprising:
receiving, by a processor, a plurality of first network architectures paired with second network architectures and corresponding performance curves of an improvement in performance of a task realized by changing from the first network architectures to the second network architectures;
training, by the processor with reinforcement machine learning, the recurrent neural network based on the plurality of first network architectures paired with second network architectures; and
determining, by the processor, a reward of the reinforcement machine learning based on the performance curves.

15. The method of claim 14, wherein the second network architectures are produced from the plurality of first network architectures with one or more network design rules.

16. A system for creation of a deep network architecture, the system comprising:
a memory; and
an image processor in communication with the memory, wherein the memory is configured to store instructions that cause the image processor to implement:
receive a first dataset; and
by a machine-learned deep network:
apply the first dataset to a recurrent neural network having a set of control policies learned by supervised learning on a plurality of second datasets and corresponding known network architectures and by reinforcement learning on a plurality of validated deep network architectures; and
generate the deep network architecture based on application of the first dataset to the recurrent neural network having the set of control policies.

17. The system of claim 16, wherein the image processor is further configured to train a deep network based on the deep network architecture, and
wherein the memory is configured to store instructions that cause the image processor to implement:
execute a task on the first dataset using the deep network and to determine a measure of performance of the task executed on the first dataset; and
update the set of control policies of the recurrent neural network based on the measure of performance, the updating producing an updated set of control policies.

18. The system of claim 17, wherein the memory is configured to store instructions that cause the image processor to implement:
apply the first dataset to the recurrent neural network having the updated set of control policies and generate an updated deep network architecture based on application of the first dataset to the recurrent neural network having the updated set of control policies.

19. The system of claim 16, wherein the memory is configured to store instructions that cause the image processor to implement:
generate a sequence of one or more layer types with one or more layer parameters based on the application of the first dataset to the recurrent neural network having the set of control policies, the sequence representing the deep network architecture.

20. The system of claim 16, memory is configured to store instructions that cause the image processor to implement:
apply a layer validation ruleset to the deep network architecture, generate a measure of adherence of the deep network architecture to the layer validation ruleset, and compare the measure of adherence to a threshold, wherein the layer validation ruleset includes rules for content, format, or the content and the format of layers the deep network architecture; and
update the set of control policies of the recurrent neural network based on the measure of adherence when the measure of adherence is below the threshold, the updating producing an updated set of control policies,
wherein the control policies are learned using a reward signal based on the measure of adherence of the deep network architecture to the layer validation ruleset.

* * * * *